United States Patent [19]

Issard et al.

[11] Patent Number: 4,887,928
[45] Date of Patent: Dec. 19, 1989

[54] DEVICE FOR A SCREW CONNECTION BETWEEN TWO PIECES

[75] Inventors: Gérard Issard; Michel Boissonnet, both of Thiers, France

[73] Assignee: Wichard, Thiers, France

[21] Appl. No.: 240,691

[22] Filed: Sep. 6, 1988

[30] Foreign Application Priority Data

Sep. 4, 1987 [FR] France .................................. 87 12712

[51] Int. Cl.$^4$ .......................... F16B 1/00; F16D 1/00; F16G 11/00
[52] U.S. Cl. .................................. 403/287; 403/261; 403/375; 403/376; 403/299; 403/361
[58] Field of Search ................. 403/326, 261, DIG. 7, 403/375, 376, 377, 316, 361, 287, 299, 256, 247, 315, 254, 356, 43, 118; 285/305

[56] References Cited

U.S. PATENT DOCUMENTS

| | | | |
|---|---|---|---|
| 1,418,298 | 6/1922 | Gorman | 403/46 |
| 2,704,681 | 3/1955 | Fischer | 403/326 |
| 3,531,144 | 9/1970 | Bizilia | 403/326 |
| 3,867,871 | 2/1975 | Shore | 403/261 X |
| 4,017,198 | 4/1977 | Mason | 403/299 X |
| 4,653,721 | 3/1987 | Bachmann et al. | 403/326 X |

FOREIGN PATENT DOCUMENTS 116338 4/1946 Switzerland .......................... 403/43

Primary Examiner—Randolph A. Reese
Assistant Examiner—Franco S. DeLiguori
Attorney, Agent, or Firm—Browdy and Neimark

[57] ABSTRACT

A device is provided for a screw connection between two pieces which can adjust the distance between the two pieces. The device comprises a first threaded piece and a second smooth piece with an annular groove close to its free end. A connector ring is screwed onto the threaded shank and engaged on the smooth piece. The connector ring has a groove of variable depth. An incompressible retaining ring is engaged in the grooves of the second piece and the connector ring. The device can be used to produce a single tension element.

6 Claims, 2 Drawing Sheets

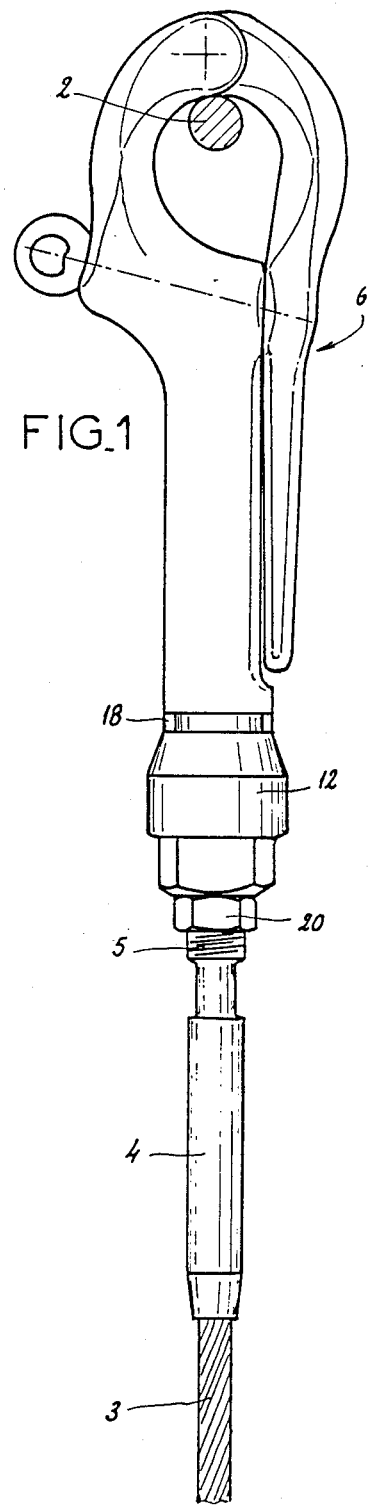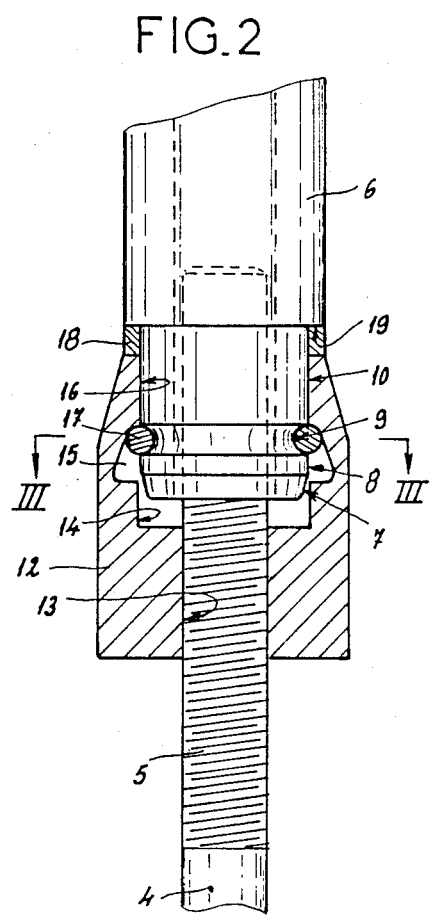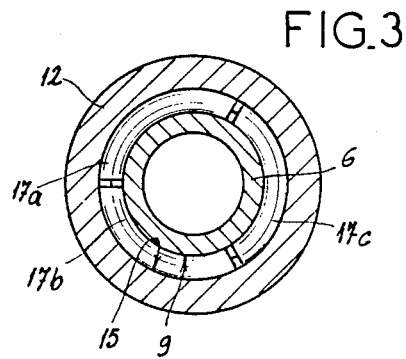

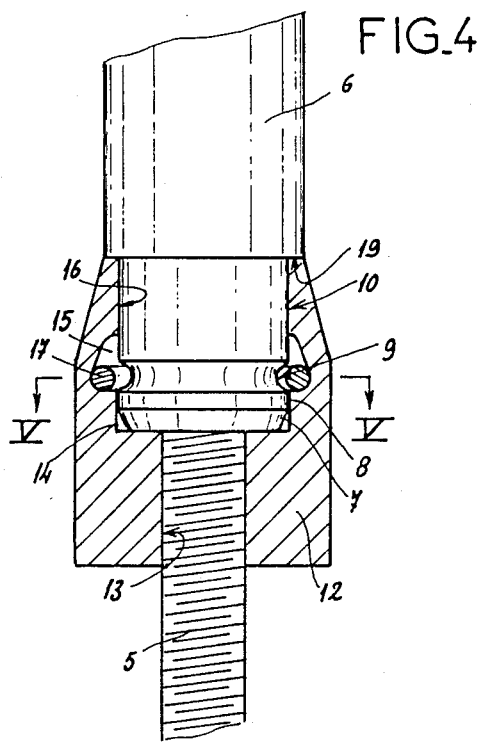
FIG_4
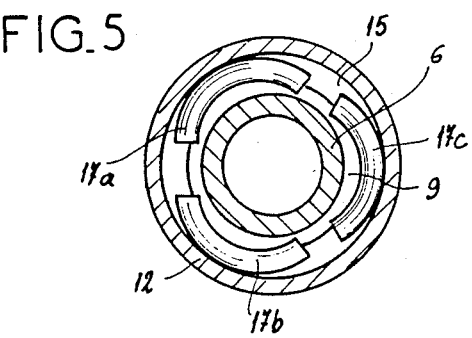
FIG_5

DEVICE FOR A SCREW CONNECTION BETWEEN TWO PIECES

FIELD OF THE INVENTION

The present invention relates to a device for a screw connection between two pieces which has the possibility of adjusting the distance between them.

Such a device may be used in particular to connect a cable to an attachment point with the possibility of regulating the tension of this cable in relation to the point of attachment.

BACKGROUND OF THE INVENTION

One device of the prior art is composed of a turnbuckle in which each of the two pieces to be joined is equipped with a threaded shank, these threaded shanks being coaxial and of opposite pitch and joined by a bush comprising two opposite inside threads in which the threaded shanks engage.

The rotation of the bush in one direction or the other brings together or moves apart the two pieces, which can be held in the required position by two lock nuts. This is a clumsy system which is suitable for assemblies which do not need frequent adjustments.

There are also turnbuckles of the single tension element type, i.e., comprising only a single screw adjustment element. These devices, however, are of complex structure, notably as regards the connection between the shank, the nut and the body.

SUMMARY OF THE INVENTION

The aim of the present invention is to provide a device of this type which is of simple structure and installation.

For this purpose the device to which it relates comprises:
- a first piece fitted with a threaded shank,
- a second piece comprising a cylindrical connecting part which has, in sequence from its free end, a chamfered zone, a cylindrical zone, a groove and then a cylindrical section, this piece having a central bore for the receipt therein of the threaded shank of the first piece;
- a retaining ring made of an incompressible material, the exterior profile of which corresponds to that of the bottom of the groove of the second piece and the cross-section of which is equal to twice the cross-section of the groove;
- a connector ring comprising in succession on its inner face a threaded opening tapped to the diameter of the threaded shank of the first piece, a smooth cylindrical zone with the diameter of the cylindrical part of the second piece, a groove the depth of which varies axially between a value equal to the thickness of the retaining ring and to half the thickness of the retaining ring considered in the radial direction, and a cylindrical zone having the diameter of the cylindrical part of the second piece; and
- means of assuring the axial locking of the connector ring in relation to the second piece in a position in which the retaining ring is engaged simultaneously in the groove of the second piece and in the part of smaller cross-section of the groove provided in the connector ring.

To assemble the device the retaining ring is first engaged in the deepest part of the groove of the connector ring, then the second piece is mounted, the end of which is introduced into the connector ring until the groove of this second piece is located opposite the retaining ring, and finally, on withdrawing the second piece until its groove, in which the retaining ring is engaged, is located opposite the least deep zone of the groove of the connector ring. The axial locking of the second piece in relation to the connector ring is then effected. The distance between the two pieces is adjusted by rotating the connector ring on the threaded shank of the first piece.

According to one characteristic of the invention, the retaining ring is made from a plurality of sections which are intended, under operating conditions, to be disposed end to end to form a ring, the diameter of which is equal to the diameter of the cylindrical opening of the connector ring, the largest dimension of each section being smaller than said diameter.

It is thus possible, in order to install the retaining ring, to install the various sections inside the connector ring, disposing them end to end in the groove of the connector ring, so as to reconstitute an open ring.

The retaining ring is conveniently made of metal wire, which is first subjected to a winding operation to form a ring and is then cut transversely into pieces to form several ring sections. The number of ring sections may, for example, be three.

According to one embodiment of this device the retaining ring is of circular cross-section.

In this case the groove provided in the connector ring advantageously has its deep and shallow parts delimited by two surfaces which, in sectional view, have a profile of the shape of an arc of a circle with the radius of the retaining ring connected by an inclined surface tangential to the two cylindrical surfaces.

In accordance with another characteristic of the invention the means for the axial locking of the connector ring on the second piece is composed of an element mounted in a definitive manner between the end of the connector ring and a shoulder provided on the second piece.

BRIEF DESCRIPTION OF THE DRAWINGS

FIG. 1 is an elevational view of the device according to the present invention;

FIG. 2 is a longitudinal view of the central part of the device in the assembled position;

FIG. 3 is a transverse sectional view along the line III—III in FIG. 2;

FIG. 4 is a view similar to that in FIG. 2 during the assembly of the device;

FIG. 5 is a transverse sectional view of the device along the line V—V of FIG. 4.

DETAILED DESCRIPTION OF EMBODIMENT

The device shown in the drawing is intended to effect a connection between an anchoring point 2 and a cable 3. The end of the cable 3, which constitutes the first piece, is provided by known means with a connecting piece 4, the end of which is threaded at 5.

The second piece which makes up the assembly is in the form of a spring hook 6 mounted on a connecting piece which has, starting from its free end, a chamfered zone 7, a cylindrical section 8, a groove 9 of semi-cylindrical cross-section and a second cylindrical section 10 of the same diameter as the section 8.

The device also comprises a connector ring 12, the inner part of which comprises, in sequence, a threaded opening 13 having an internal diameter the same as the diameter of the threaded part 5 of the first piece, a smooth zone 14 having an internal diameter the same as the diameter of the cylindrical sections 8, 10 of the second piece, a groove 15 and a smooth zone 16 also having an internal diameter the same as the diameter of the cylindrical part 10 of the second piece.

The device also comprises a retaining ring 17 which, in the embodiment shown in the drawing, is of circular cross-section, its cross-section being equal to double the cross-section of the groove 9 provided in the second piece.

As regards the groove 15 provided in the connector ring, its depth varies axially between a wide part equal to the thickness of the retaining ring and a narrow part of half the thickness of the retaining ring. The two ends of this groove 15, which are rounded to the radius of the retaining ring, are connected with each other by an inclined surface which is tangential to them.

The outer surface of the connector ring 12 may be provided with maneuvering means such as striations or the like, a profile with several panels or may be fitted with a single or double arm, either fixed or articulated, or else with a regulating wheel.

Finally, the device according to the invention is provided with an axial locking means, such as a ring 18, composed of an open or closed ring or a pin, for example, intended to engage the cylindrical section 10 of the second piece between a shoulder 19 which this second piece comprises and the corresponding end of the ring 12.

As can be seen in particular from FIGS. 3 and 5, the retaining ring 17 is made in three pieces 17a, 17b, 17c which, when placed end to end, form an open ring. This conformation of the ring in a plurality of pieces is advantageous firstly for permitting the introduction of the retaining ring 17 inside the connector ring 12, and also for permitting deformations of the retaining ring 17 between the assembling position and the assembled position of the system.

In the assembled state the device is in the position shown in FIG. 2. The retaining ring 17 is disposed in the groove 9 and in the narrow part of the groove 15 of the connector ring 12, ensuring an axial connection between the ring 12 and the second piece 6. In this position the connector ring 12 cannot slide in relation to the second piece on account of the presence of the locking ring 18.

To modify the tension of the cable 3 by modifying the distance between the two pieces constituting the assembly it is sufficient to unscrew the lock nut 20 mounted on the threaded part 5 of the connecting piece 4 and turn the connector ring 12 on the threaded shank 5, a movement which produces an axial displacement of the threaded part 5 of the connecting piece 4 and consequently a modification of the distance between the two main pieces.

When the adjustment has been made, the lock nut 20 is re-tightened.

The assembly of the device is illustrated in FIGS. 4 and 5. First, the retaining ring pieces 17 are engaged in the connector ring 12, and more precisely in the deeper zone of the groove 15 as clearly seen FIG. 4. The second piece 6 is then fully engaged in the connector ring 12, i.e., until its groove 9 is located facing the retaining ring 17. The second piece 6 is then withdrawn and entrains with it the retaining ring 17 until this is brought into the narrow part of the groove 15 of the connector ring 12, as shown in FIG. 2. Any axial movement of the connector ring 12 in relation to the second piece 6 is then prevented after the installation of a locking ring 18 or the like.

As can be seen from the foregoing remarks, the invention brings a considerable improvement to the existing technique by providing a screw regulating device between two elements which is simple in design and practical to use.

As is obvious, the invention is not limited merely to the embodiment of this device described above by way of example: on the contrary, it covers all variant embodiments.

Thus in particular the retaining ring could be made up of a different number of sections or have a cross-section other than circular, notably square or rectangular, without, however, going beyond the scope of the invention.

The foregoing description of the specific embodiments will so fully reveal the general nature of the invention that others can, by applying current knowledge, readily modify and/or adapt for various applications such specific embodiments without departing from the generic concept, and therefore such adaptations and modifications are intended to be comprehended within the meaning and range of equivalents of the disclosed embodiments. It is to be understood that the phraseology or terminology herein is for the purpose of description and not of limitation.

What is claimed is:

1. A device for forming a screw connection between a first piece and a second piece, said device being adapted and constructed to regulate the distance between said pieces, said device comprising:
   a first piece fitted with a threaded shank;
   a second piece comprising a cylindrical connecting section having a free end and a connected end;
   said connection section including, in succession from said free end, a chamfered zone, a cylindrical zone, a groove, and a cylindrical part, said second piece having a central bore for the receipt therein of said threaded shank of said first piece;
   a retaining ring made of an incompressible material, the exterior profile of said retaining ring corresponding to the exterior profile of the bottom of said groove of said second piece, and the cross-section of which is equal to twice the cross-section of said groove;
   a connector ring having an interior face, said interior face of said connector ring including, in succession, a threaded opening of the diameter of said threaded shank of said first piece, a smooth zone of the diameter of the cylindrical part of said second piece, a groove having a depth which varies axially between a wide part equal to the thickness of said retaining ring and a narrow part of half the thickness of said retaining ring considered in the radial direction, and a zone of the diameter of said cylindrical part of said second piece; and
   means for effecting the axial locking of said connector ring in relation to said second piece in a position in which the retaining ring is engaged simultaneously in said groove of said second piece and in the narrow part of said groove in said connector ring.

2. The device according to claim 1 wherein said retaining ring comprises a plurality of sections disposed end to end to form said retaining ring, the outer diameter of said retaining ring being equal to the diameter of the cylindrical opening of the connector ring.

3. The device according to claim 1 wherein said retaining ring is made of metal wire which is first subjected to a winding operation to form a ring and then is divided transversely into sections to form a plurality of ring sections.

4. The device according to claim 1 wherein said retaining ring is of circular cross-section.

5. The device according to claim 4 wherein said groove provided in said connector ring has its wide and narrow parts delimited by two surfaces which, viewed in cross-section, have profiles shaped like an arc or a circle with the radius of said retaining ring and connected by an inclined surface tangential to said profiles.

6. The device according to claim 1 wherein means for the axial locking of said connector ring on said second piece comprises and element mounted between an end of said connector ring opposite the threaded opening and a shoulder on said second piece.

* * * * *